Nov. 22, 1960  S. LEES  2,960,878
GIMBAL SYSTEM
Filed Dec. 26, 1957  2 Sheets-Sheet 1

INVENTOR.

Nov. 22, 1960   S. LEES   2,960,878
GIMBAL SYSTEM
Filed Dec. 26, 1957   2 Sheets-Sheet 2
FIG.2
FIG.3
FIG.4
FIG.7
FIG.5
FIG.6
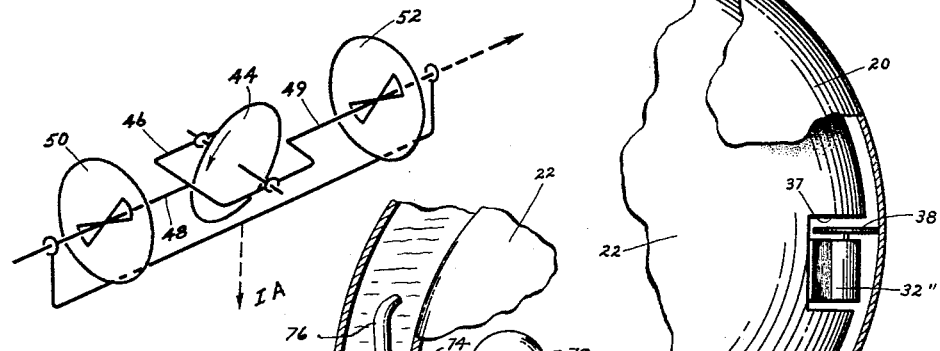
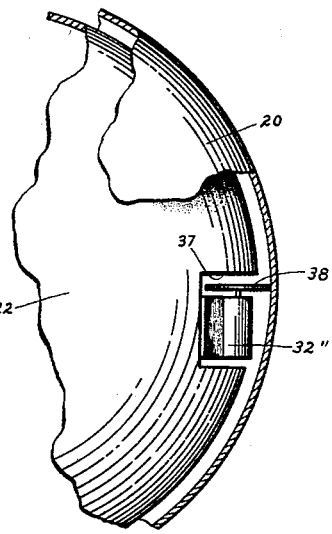
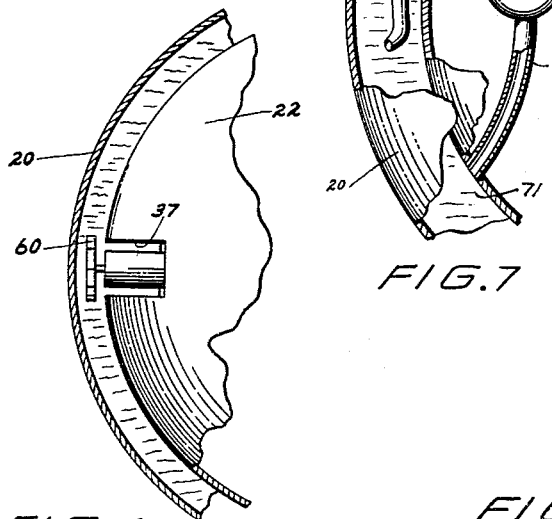
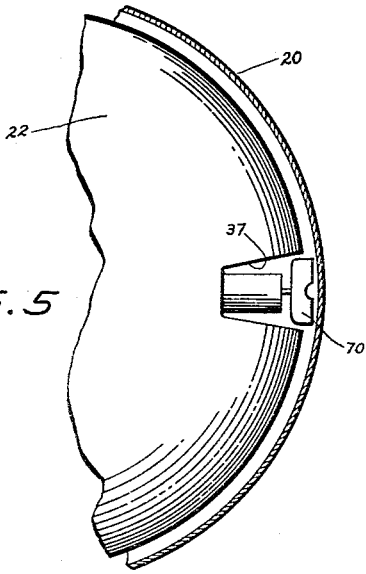
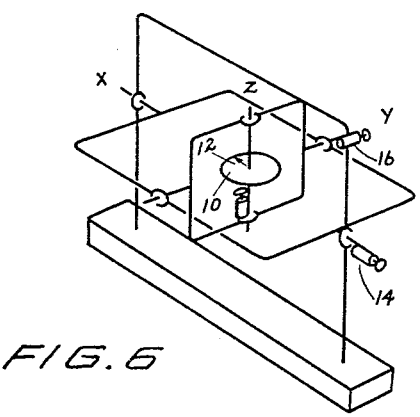
INVENTOR.
Sidney Lees
BY George L. Greenfield
his atty

United States Patent Office 2,960,878
Patented Nov. 22, 1960

2,960,878

GIMBAL SYSTEM

Sidney Lees, 544 Walnut St., Newton, Mass.

Filed Dec. 26, 1957, Ser. No. 705,196

11 Claims. (Cl. 74—5.34)

My invention relates generally to the field of geometric stabilization and more particularly comprises a new and improved gimbal system for supporting a controlled member with complete freedom of rotational movement about all of the coordinates which define a geometric reference.

Any device used to establish a geometric reference should be capable of holding the reference regardless of the disturbing forces applied to it and should also be capable of changing its orientation upon command. These requirements are necessary regardless of the physical source or law that is used to establish the reference coordinate system. Such devices normally include a gimbal system bearing a controlled member which indicates or establishes the reference, one or more orientation detectors for producing a signal proportional to the angular deviation of the controlled member from the reference position, and one or more drive subsystems for returning the controlled member to its reference position in response to the command of the detector.

The primary object of my invention is to simplify the gimbal system which supports the controlled member used to establish the geometric reference. The multi-gimbal systems now in common use to support a controlled member with three degrees of rotational freedom have a number of disadvantages. Perhaps the foremost among these is the inability of the drive subsystems to use directly the signals from the orientation detectors to reorient the control member in its reference position. The signals produced by the orientation detectors must be resolved and recombined by rather complicated equipment before the signals are directed to the drive subsystems which control the relative positions of the gimbals.

Other important disadvantages of the multi-gimbal systems result from the multiplicity of bearings used to support each gimbal. Their number alone obviously tends to weaken the structure. Moreover, these bearings must of necessity be very precise, that is, they must support each gimbal in a very precise orientation. This precision is accomplished by preloading the bearings. As a direct result of this preloading, the bearings impose a high friction load on the system. It should also be noted that it is necessary to make each of the gimbals very rugged structurally to reduce distortion of the gimbals. This is adversely reflected in the size and weight of the unit and the load imposed on the bearings. Another disadvantage of the multi-gimbal systems is that by their very nature dynamic coupling exists between the gimbals and the orientation control or positioning system of the instruments.

Thus, to accomplish the broad general object of my invention, I provide means which permit direct use by the positioning systems of the signal produced by the orientation detecting devices. That is, each of the orientation detectors is connected to one or a pair of the different drive subsystems which are capable of moving the controlled member about the axis to which the particular orientation detector is sensitive. There is no resolving and recombining of the signals produced by the orientation detectors. The assembly is strengthened and precise orientation is achieved by reducing the number of bearings which support the gimbal structure. All this is accomplished in a device of reduced size and with a reduction in the dynamic coupling effect referred to above.

To accomplish these and other objects, my invention includes among its many features a spherical case within which is mounted the stabilization unit including its gimbal. In place of the conventional multi-gimbal system, I employ a second sphere as a three degree of rotational freedom gimbal which is floated within the case. The spherical gimbal is located in the case by at least four bearing surfaces which are spaced equidistant over the outer surface of the gimbal. When four bearings are employed, the distribution of the bearings corresponds to the four apexes of a pyramid. This arrangement permits complete freedom of movement of the spherical gimbal within the case. The spherical gimbal carries the drive subsystems and the orientation detectors which are capable of producing an electrical signal proportional to the angular deviation from the reference coordinates. Examples of such orientation detectors are magnetic compasses which relay upon the magnetic field of the earth, radar devices, radio orientation and location systems, optical instruments, accelerometers for detecting the orientation of the earth's gravitation field and gyro units which may establish reference orientations in inertial space.

The following description will be confined to geometric stabilization devices which employ gyro type instruments as orientation detectors but it is so be understood that my gimbal system is not limited to that variety of orientation detector.

The gyro units are disposed on a controlled member fixed within the spherical gimbal. These gyro units detect angular deviations from the reference coordinates of the preselected orientation and produce signals which are proportional to the deviations. The signals of the gyro units are transmitted directly through amplifiers to drive subsystems adapted to move the gimbal about the coordinate axes established by the gyro units. The drive subsystems may act upon the case either mechanically, electrically, pneumatically or dydraulically to move the spherical gimbal in response to the signal received from the gyro unit.

These and other objects and features of my invention along with their incident advantages will be better understood and appreciated from the following detailed description of a number of embodiments thereof, selected for purpose of illustration and shown in the accompanying drawings in which:

Figure 2 is a line schematic diagram of a single degree of freedom gyro unit which may be employed as an orientation detector in my invention;

Figure 3 is an enlarged fragmentary view showing the manner in which the drive subsystem of Figure 1 operates to move the gimbal with the case;

Figures 4, 5 and 7 are enlarged fragmentary views showing different embodiments of the drive subsystems for moving the gimbal within the case; and Figure 6 is a line schematic drawing of a conventional three-axis or multi-gimbal system for supporting a controlled member.

Figure 1:
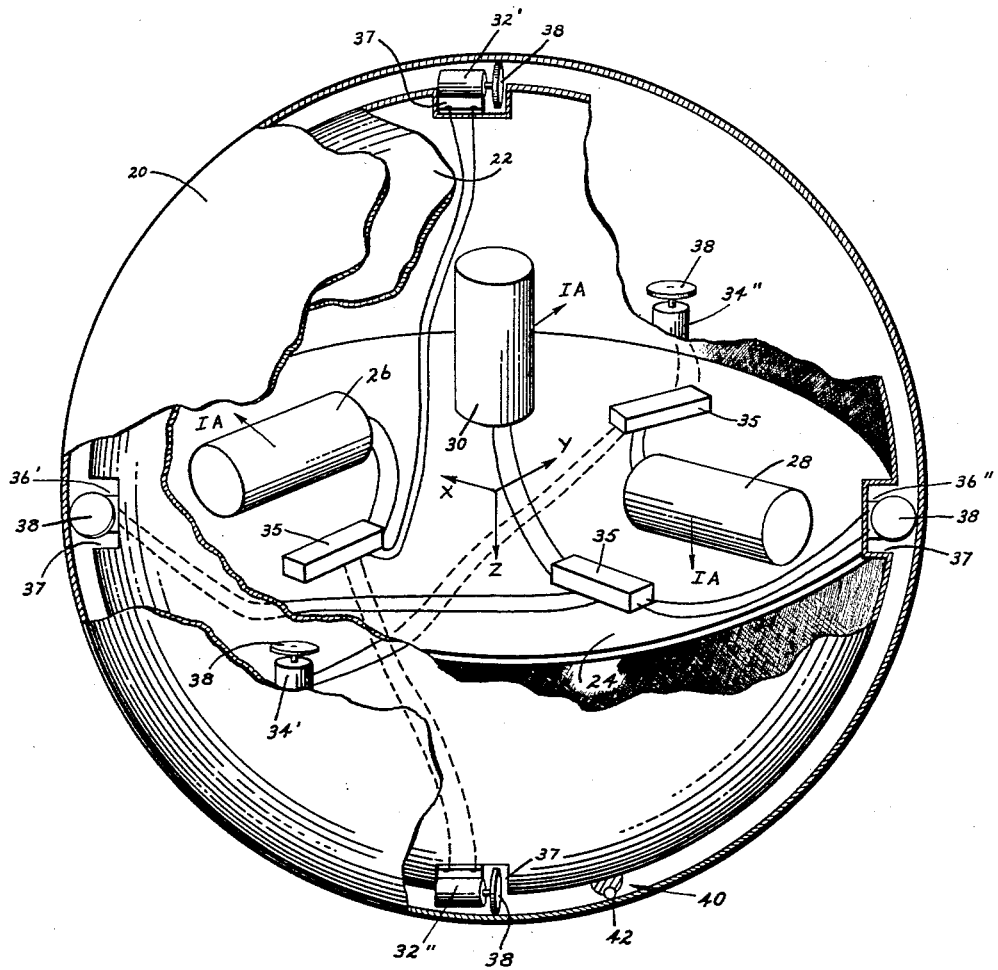
Figure 1 is a perspective view, partially in section, diagrammatically illustrating one embodiment of my invention.

Before describing in specific terms the embodiments of my invention shown in the drawings, the conventional multi-gimbal system shown in Figure 6 will be described, particularly pointing out the problems of resolution and recombination incident to such a support for a controlled member. Assume that the controlled member 10 is illustrated in its geometric reference position with the arrow 12 coincident with or parallel to the X axis. If an orientation detector disposed on the controlled member 10 senses an angular deviation between the arrow 12 and the X axis in the plane of the X and Z axes, the signal produced which is proportional to that deviation must be properly divided between the outer gimbal drive motor 14 and the middle gimbal drive motor 16 to reorient the controlled member 10 in its reference position. However, if this deviation is transverse to but not normal to the X—Z plane and a number of detectors are used, the signals produced by each detector sensitive to that deviation necessarily must be divided between the various gimbal drives and the divided signals of each detector in turn must be combined at the various gimbal drives to restore the controlled member to its reference position. With my invention each of the detectors acts directly upon one drive motor and resolution and recombination are eliminated. This will be more clearly appreciated in the following detailed description.

The embodiment of my invention shown in Figure 1 includes in its general organization a spherical case 20 which may be secured in any conventional manner to a support (not shown), a spherical gimbal 22 concentrically disposed within the case 20, a controlled member 24 in the nature of a platform which extends across the diameter of the gimbal, and a number of gyro units 26, 28 and 30, each connected respectively to pairs of drive motors 32′ and 32″, 34′ and 34″, and 36′ and 36″, through amplifiers 35. Although I have illustrated gyro units as orientation detecting devices, it is to be understood that any of the other types of orientation detecting devices suggested in the introduction may be used.

A number of different methods may be employed to position the spherical gimbal 22 within the case 20. It is only necessary that these methods permit complete freedom of movement of the gimbal within the case about the coordinates of the reference position and maintain the centers of the spheres 20 and 22 coincident. In the specific embodiment illustrated, these coordinates are indicated as X, Y and Z, established by the input axes IA of the gyro units.

Pockets 37 are formed about the outer surface of the gimbal 22 to receive the various drive motors. It will be noted in Figure 2 that the drive motors are teamed in pairs and each pair is adapted to move the gimbal 22 about one of the reference coordinates. For example, the drive motors 32′ and 32″ are so positioned that their operation will cause the gimbal 22 to rotate about the X axis, the motors 34′ and 34″ are oriented so as to cause the gimbal 22 to move about the Z axis and the motors 36′ and 36″ are so positioned to move the gimbal about the Y axis. It should be understood that only one drive motor need be used to move the gimbal about each coordinate although two drive motors may be preferable.

Each of the drive motors carries a drive wheel 38 on the end of its shaft and these drive wheels engage the inner surface of the case 20. The wheels alone may serve to support the gimbal with complete freedom of rotation and with its center coincident to that of the case 20. However, if desired, a number of bearings such as that shown at 40 may be spaced about the outer surface of the gimbal with the balls 42 supporting the gimbal on the inner surface of the case. To aid in the support of the gimbal and to reduce frictional forces which may otherwise be generated by the bearings 40 and the drive wheels 38, the space between the gimbal and the case may be filled with a liquid so that the gimbal floats within the case and can be made exactly bouyant. Floatation may also be achieved by a magnetic field or by an electrostatic field using well known methods. This also reduces the coupling of the gimbal to the case and thereby reduces the influence of base motion which tends to upset the controlled member from its reference position.

The pairs of drive motors are connected through the amplifiers 35 to their respective gyro units. These gyro units may be of a type shown schematically in Figure 2. They include a gyro element 44 supported in a gimbal 46 in turn carried by a pair of coaxial shafts 48 and 49. On one shaft 48 is a torque generator 50 which is used to change the reference orientation of the gyro element 44. The other shaft 49 carries a signal generator 52, which produces a signal proportional to the angular deviation of the gyro element 44 with respect to the input axis IA of the unit. A gyro unit of this type is illustrated and described in detail in United States Patents Nos. 2,752,790 and 2,752,791. Because the details of the device form no part of my invention, it is considered unnecessary to describe them in detail here. Suffice it to say that such a unit which has a single degree of freedom produces an output signal proportional to the angular deviation of the unit with respect to its input axis.

Referring again to Figure 1, the reader will note that three such units are employed and are arranged orthogonally on the controlled member 24. Their respective input axes indicated by arrows IA are parallel to the X, Y and Z coordinates. As a result, any angular deviation of the controlled member 24 with respect to the X axis is detected by the gyro unit 26 which in turn produces a signal proportional to the deviation. This signal is passed through amplifier 35 to the drive motors 32′ and 32″ operated by that signal. Excitation of the drive motors 32′ and 32″ cause their wheels 38 which bear against the inner surfaces of the case 20 to rotate and restore the controlled member 23 to its original or reference position with respect to the X axis. The gyro units 28 and 30 work in the same manner as the gyro unit 26 but control the position of the controlled member 24 about the Z and Y axes respectively by means of the drive motors 34′ and 34″ and drive motors 36′ and 36″.

The embodment of my invention shown in Figures 1 and 3 employs a mechanical drive, namely the wheels 38, to move the gimbal 22 within the case 20. In Figure 4 I have illustrated an hydraulic drive for the gimbal 22. When the space between the gimbal and the case is filled with a liquid to achieve floatation, the bladed wheels 60 may replace the drive wheels 38 mounted on the shafts of the dr've motors and accomplish the same purpose. The bladed wheels merely react against the liquid which fills the space between the two spheres and each moves the sphere to which it is connected about the particular axis with which the bladed wheel is oriented. When such a device is used, it is necessary to employ the bearings 40 shown in Figure 1 or some equ'valent structure to support and locate the gimbal within the case 20.

In Figure 5 I have shown the manner in which the torque-generating action of the drive motors may work electromagnetically on the sphere 20. In this embodiment, the drive wheel or bladed wheel is replaced by a device which will induce a rotating magnetic field in the wall of the case 20. I have illustrated a horseshoe magnet 70, for this purpose, but of course it is merely exemplary of the large number of devices which may be used to accomplish the same purpose. As the motor causes the magnet to rotate and create the rotating magnetic field in the wall of the case 20, in accordance with Lenz's law there is a reaction torque exerted by the fixed case upon the motor connected to the gimbal 22. The torque causes the gimbal to move about the reference axis w'th which it is oriented, in this example, the axis of the motor.

The rotating horseshoe magnet can be replaced by the rotating magnetic field generated by the field structure of a conventional multi-phase A.C. induction motor. In this situation the coils bearing the several A.C. phases are arranged to cause the rotating magnetic field to be projected into the wall of the case 20, thereby inducing a current and a reaction magnetic field in the wall of the case. Again, by Lenz's law of induction, a reaction torque is induced in the source attached to the gimbal 22.

The embodiment shown in Figure 7 is another means capable of moving the gimbal 22 in the case 20. This means may act either hydraulically or pneumatically to accomplish the desired results. Briefly, a pump 70, connected by a duct 72 to the space between the two spheres, directs the fluid 71 within that space (either a liquid or a gas) through the duct 74 to the impeller 76. The jets of the fluid which leave the impeller will cause the gimbal 22 to move angularly within the case 20 about the axis of the impeller. Thus, by orienting the impeller so that its axis is parallel to or coincident with one of the reference coordinates and driving the pump 70 by the signal of the orientation detector sensitive to angular deviations about that coordinate, the gimbal and the controlled member may be restored to their reference position. It should be understood that a fluid source, such as compressed air, liquified carbon dioxide, freon, etc., could be contained within the gimbal and used in place of the fluid between the spheres.

Because the purpose of a device of the class which I have invented is to establish a reference position, some means must be provided to determine at any time the orientation of the gimbal 22. This may be accomplished visually by making the case 20 of a transparent material. Alternately, a coded magnetic coating may be applied to the outer surface of the gimbal and be detected by some sensing device which can translate the coded magnetic coating to indicate the precise position of the gimbal. In such a device it is also necessary to bring power in to the inner sphere or gimbal to operate the various drive motors of the drive subsystem and the orientation detectors. A number of highly flexible leads may be inserted through an opening (not shown) in the case 20, which prevents loss of the liquid from the case, and these wires may be threaded through a similar opening (not shown) in the gimbal to the various points where power is necessary. Flat flexible conductors now readily available may be used for this purpose.

From the foregoing description the advantages of my invention over the multi-gimbal system of the type shown in Figure 6 are apparent. The problems associated with resolution and recombination, excessive numbers of bearings, distortion and dynamic coupling are substantially eliminated. A much simpler device results.

Those skilled in the art will appreciate that numerous modifications may be made of my invention without departing from its spirit. Therefore, I do not intend to limit the breadth of my invention to the specific embodiments illustrated and described but rather it is my intention that the scope of my invention be determined by the appended claims and their equivalent.

I claim:

1. In a device for establishing a geometric reference, a gimbal system comprising a spherical case, a spherical gimbal disposed in the case, means retaining the gimbal with complete freedom of rotation in the case and with the centers of the case and gimbal coincident, a controlled member disposed in and secured to the gimbal, at least one orientation detector connected to the controlled member for producing a signal the magnitude of which is a function of the angular deviation of the controlled member from one coordinate of the reference position of the controlled member, drive means carried by the gimbal and electrically connected through an amplifier to the orientation detector exerting a reaction torque on the gimbal for rotating the gimbal in the case about said one coordinate in a direction opposite to the deviation in response to the signal of the orientation detector, said torque being proportional to the magnitude of the signal.

2. In a device for maintaining a geometric reference; a controlled member, a spherical gimbal carrying the controlled member, a spherical case spaced from and surrounding the gimbal, means supporting the gimbal within the case with the centers of the gimbal and case coincident and affording the gimbal complete rotational freedom, an orientation detector carried by the gimbal and producing an electrical signal the magnitude of which is a function of the deviation of the controlled member from one coordinate of a reference position, a motor carried by the gimbal and excited by the signal from the single orientation detector, said motor having a shaft which rotates at a speed proportional to the signal, and means carried by the shaft and coupled to the case producing a reaction torque on the gimbal about said one coordinate proportional to the speed of rotation of the shaft for moving the gimbal in the case about said coordinate in a direction opposite to the deviation.

3. A device as defined in claim 2 further characterized by the last named means including a drive wheel mounted on the motor shaft and engaging the inner surface of the case.

4. A device as defined in claim 2 further characterized by a liquid filling the space between the case and the gimbal, and the last named means including a bladed wheel carried by the motor shaft and reacting against the liquid in response to excitation of the motor.

5. A device as defined in claim 2 further characterized by said last named means including a device for inducing a rotating magnetic field in the case and moving the gimbal in reaction to the rotating magnetic field.

6. A device for establishing and maintaining a geometric reference comprising a controlled member, a spherical gimbal carrying the controlled member, a spherical case spaced from and surrounding the gimbal, means supporting the gimbal in the case affording the gimbal complete freedom of rotation and maintaining the centers of the gimbal and the case coincident, three orientation detectors carried in the gimbal and capable of producing signals which are proportional to the angular deviation of the controlled member from the coordinates of the geometric reference position, each of said orientation detectors responding to deviations about a different coordinate, and three drive means each electrically connected to a single and separate orientation detector and producing a reaction torque on the gimbal about the coordinate to which its orientation detector is sensitive proportional to the signal produced by its detector, said torques moving the gimbal within the case about the different coordinates in directions opposite to the deviations.

7. In a device for establishing and maintaining a geometric reference; a controlled member having a reference position, a support for the controlled member, a case spaced from and surrounding the support, means bearing the support within the case with complete rotational freedom, an orientation detector carried by the controlled member and producing an electrical signal which is a function of the deviation of the controlled member from one coordinate of its reference position, and means including a drive motor receiving the undivided signal produced by the single orientation detector and producing a reaction torque on the controlled member proportional to the signal for moving the controlled member about said coordinate in a direction opposite to the deviation and returning the controlled member to its reference position.

8. A device as defined in claim 7 further characterized by said means bearing the support achieving floatation of the support within the case.

9. A device as defined in claim 1 further characterized by the drive subsystem including an impeller and a fluid source, and means for discharging the fluid through the impeller into the space between the gimbal and case.

10. In a device for establishing and maintaining a geometric reference; a controlled member, a gimbal carrying the controlled member, a spherical case spaced from and surrounding the gimbal, means supporting the gimbal within the case with complete rotational freedom, an orientation detector carried by the gimbal and producing an electrical signal which is a function of the deviation of the controlled member from a reference position about one coordinate of said position, and means carried by the gimbal and excited by the signal from the one orientation detector for producing a rotating magnetic field in the case which induces a reaction torque on the gimbal only about said coordinate and which is a function of the signal, said reaction torque moving the gimbal about the coordinate in a direction opposite to the deviation and within the case to return the controlled member to its reference position.

11. In a device for establishing and maintaining geometric references; a controlled member having a reference position, a spherical gimbal carrying the control member, a spherical case spaced from and surrounding the gimbal, means supporting the gimbal within the case and achieving floatation of the gimbal in the case, an orientation detector carried by the gimbal and producing an electrical signal which is a function of the deviation of the controlled member about one coordinate of its reference position, and means carried by the gimbal and excited by the signal from the one orientation detector for producing a rotating magnetic field in the case which induces a reaction torque about said coordinate on the gimbal which is a function of the signal, said reaction torque moving the gimbal within the case about the coordinate in a direction opposite to the deviation to return the controlled member to its reference position.

References Cited in the file of this patent

UNITED STATES PATENTS

| | | |
|---|---|---|
| 1,310,862 | Gray | July 22, 1919 |
| 1,501,886 | Abbot | July 15, 1924 |
| 2,631,455 | Wing | Mar. 17, 1953 |
| 2,728,979 | Summers | Jan. 3, 1956 |
| 2,752,792 | Draper | July 3, 1956 |
| 2,785,573 | Bentley | Mar. 19, 1957 |

FOREIGN PATENTS

| | | |
|---|---|---|
| 14,032 | Netherlands | Dec. 15, 1925 |